(12) United States Patent
Lee et al.

(10) Patent No.: US 7,154,663 B2
(45) Date of Patent: Dec. 26, 2006

(54) DISPERSION COMPENSATING FIBER FOR S-BAND DISCRETE RAMAN AMPLIFIER

(75) Inventors: Won Kyoung Lee, Daejeon (KR); Sun Hyok Chang, Daejeon (KR); Moo Jung Chu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/196,464

(22) Filed: Aug. 3, 2005

(65) Prior Publication Data

US 2006/0126160 A1 Jun. 15, 2006

(30) Foreign Application Priority Data

Dec. 14, 2004 (KR) ............ 10-2004-0105709

(51) Int. Cl.
*H01S 4/00* (2006.01)
*H04B 10/12* (2006.01)

(52) U.S. Cl. .................. 359/334; 385/127
(58) Field of Classification Search .......... 359/334; 385/127, 122, 124, 327
See application file for complete search history.

(56) References Cited

U.S. PATENT DOCUMENTS

| | | | |
|---|---|---|---|
| 3,997,241 A * | 12/1976 | Nishida et al. ............ | 385/127 |
| 5,659,649 A * | 8/1997 | Nouchi et al. ............ | 385/124 |
| 5,675,688 A * | 10/1997 | Nouchi et al. ............ | 385/124 |
| 6,233,387 B1 * | 5/2001 | Berkey et al. ............ | 385/123 |
| RE37,457 E * | 11/2001 | Nouchi et al. ............ | 385/124 |
| 6,396,987 B1 * | 5/2002 | de Montmorillon et al. ............ | 385/123 |
| 6,400,877 B1 | 6/2002 | Kato et al. | |
| 6,445,864 B1 | 9/2002 | Jiang et al. | |
| 6,449,416 B1 * | 9/2002 | Lee et al. ............ | 385/127 |
| 6,504,973 B1 | 1/2003 | DoGiovanni et al. | |
| 6,535,676 B1 * | 3/2003 | de Montmorillon et al. ............ | 385/123 |
| 6,633,714 B1 * | 10/2003 | de Montmorillon et al. ............ | 385/124 |
| 6,665,481 B1 | 12/2003 | Hebgen et al. | |
| 6,751,390 B1 | 6/2004 | Qi et al. | |
| 6,757,468 B1 * | 6/2004 | Bickham et al. ............ | 385/127 |

(Continued)

FOREIGN PATENT DOCUMENTS

KR 10-2002 0029529 4/2002

(Continued)

OTHER PUBLICATIONS

Saleh, B. E. A., and Teich, M. C., Fundmentals of Photonics, Wiley, New York, (1991), pp. 272-296.*

(Continued)

*Primary Examiner*—Jack Keith
*Assistant Examiner*—Eric Bolda
(74) *Attorney, Agent, or Firm*—Ladas & Parry LLP

(57) ABSTRACT

A dispersion compensating fiber (DCF), which is an amplification medium of an S-band discrete Raman amplifier (RA), has a trapezoid core, an inner cladding surrounding the trapezoid core; and an outer cladding surrounding the inner cladding. A ring is disposed between the inner cladding and the outer cladding. The refractive index plotted across the diameter of the trapezoid core as a function of distance is substantially trapezoidal in shape. The difference in refractive index between the trapezoid core and the outer cladding is 1.2 to 1.6%; between the inner cladding and the outer cladding is 0.4 to 0.8%; and between the ring and the outer cladding is 0.2 to 0.6%. The thickness of the ring is 0.8 to 1.2 times the radius of the trapezoid core, and the thickness of the inner cladding is 1 to 3 times the radius of the trapezoid core.

5 Claims, 9 Drawing Sheets

U.S. PATENT DOCUMENTS

| | | | |
|---|---|---|---|
| 6,813,430 B1* | 11/2004 | Aikawa et al. | 385/127 |
| 6,819,847 B1* | 11/2004 | Matsuo et al. | 385/123 |
| 6,904,217 B1* | 6/2005 | Kalish et al. | 385/127 |
| 6,937,805 B1* | 8/2005 | Aikawa et al. | 385/123 |
| 6,952,517 B1* | 10/2005 | Kalish et al. | 385/124 |
| 6,999,667 B1* | 2/2006 | Jang et al. | 385/124 |
| 2002/0003938 A1* | 1/2002 | Srikant | 385/124 |
| 2002/0182055 A1* | 12/2002 | Nagle | 415/111 |
| 2003/0081921 A1* | 5/2003 | Sillard et al. | 385/124 |
| 2003/0095769 A1* | 5/2003 | Aikawa et al. | 385/127 |
| 2003/0174987 A1* | 9/2003 | Bickham et al. | 385/127 |
| 2004/0146260 A1* | 7/2004 | Kalish et al. | 385/127 |
| 2004/0218881 A1* | 11/2004 | Rathje et al. | 385/123 |
| 2004/0234219 A1* | 11/2004 | Aikawa et al. | 385/127 |
| 2005/0063656 A1* | 3/2005 | Jablonowski et al. | 385/127 |
| 2005/0185905 A1* | 8/2005 | Burke et al. | 385/123 |

FOREIGN PATENT DOCUMENTS

KR  2003/0003706  1/2003

OTHER PUBLICATIONS

'Raman Amplifiers for Telecommunications' Islam, IEEE Journal of Selected Topics in Quantum Electronics, vol. 8, No. 3, May/Jun. 2002, pp. 548-559.

* cited by examiner

DISPERSION COMPENSATING FIBER FOR S-BAND DISCRETE RAMAN AMPLIFIER

CROSS-REFERENCE TO RELATED APPLICATION

This application claims priority to and the benefit of Korean Patent Application No. 2004-105709, filed Dec. 14, 2004, the disclosure of which is incorporated herein by reference in its entirety.

BACKGROUND

1. Field of the Invention

The present invention relates to a dispersion compensating fiber (DCF) for an S-band discrete Raman amplifier (RA).

2. Discussion of Related Art

Nowadays, as there have been intensive studies on the extension of the transmission band as part of a method for increasing transmission capacity, much attention has been paid to transmission techniques in the S-band, which is a low-loss band, as well as conventional C/L-band. Here, a loss characteristic of a silica fiber according to the wavelength is illustrated in FIG. 1. Generally, the C-band ranges from 1525 to 1565 nm, the L-band ranges from 1565 to 1605 nm, and the S-band ranges from 1485 to 1525 nm. In the C- or L-band, optical signals can be amplified using an erbium doped fiber amplifier (EDFA). However, a conventional EDFA cannot amplify optical signals in the S-band because it has no gain in the S-band.

There are a rare-earth-element doped fiber amplifier such as a thulium doped fiber amplifier (TDFA), a Raman amplifier (RA) using Raman scattering in optical fibers, and a semiconductor amplifier, as amplifiers having gain in the S-band.

The TDFA employs thulium doped fibers (TDFs), which are made by doping thulium into nonsilica-based glass (i.e., fluoride glass), as amplification mediums. Thus, when the TDFA is connected to common silica fibers, great loss and problems are generated.

With the development in the manufacturing technology of semiconductor amplifiers, the semiconductor amplifiers are on the rise. However, a lot of technical limitations, for example, small gain and high polarization mode dispersion (PMD), still remain unsolved.

The RA has the advantage of having gain in various bands according to the pump wavelength, so it is appropriate for the S-band in which optical signals cannot be amplified using an EDFA. Above all, unlike a distributed RA that enables the Raman pumping of transmission lines, a discrete RA is inserted into a transmission system as an additional element to achieve gain. An S-band discrete RA includes pump laser diodes (LDs), optical fibers as amplification mediums, and other optical devices, such as a wavelength division multiplexer (WDM) that couples input optical signals and pump signals. So far, the gain of the S-band discrete RA has been controlled by adjusting the wavelength and output power of the pump LDs and the length of dispersion compensating fibers (DCFs). Accordingly, the S-band discrete RA cannot achieve high gain due to a limited output power of the pump LDs and the high loss of C-band DCFs and also has no adequate dispersion characteristics.

In this regard, a method of increasing gain by using nonlinear fibers having a high Raman gain coefficient along with conventional DCFs was introduced by David J. DiGiovanni ["Raman Amplified Dispersion Compensating Modules", U.S. Pat. No. 6,504,973 B1, Jan. 7, 2003]. However, it is troublesome that the nonlinear fibers be designed and manufactured considering the dispersion of conventional DCFs, and it is difficult to expect a substantial increase in gain because the nonlinear fibers cause greater loss than the conventional DCFs.

SUMMARY OF THE INVENTION

The present invention is directed to a dispersion compensating fiber (DCF), which has dispersion characteristics appropriate for compensating dispersion in an S-band of single mode fiber (SMF) and a high Raman gain coefficient per effective area, thus improving the gain and dispersion characteristics of the S-band discrete RA.

In order to improve the gain and dispersion characteristics of the S-band discrete RA, the present invention provides the DCF, which has a higher Raman gain coefficient per effective area and a larger negative dispersion value than a conventional C-band DCF. Further, in order to efficiently compensate for the dispersion of a single mode fiber (SMF), the DCF is designed such that it has a dispersion slope opposite to that of the SMF.

One aspect of the present invention is to provide a DCF, which is an amplification medium of an S-band discrete RA. The DCF includes a core having a refractive index $n_1$; an inner clad (or cladding) having a refractive index $n_2$ and surrounding the core; and an outer clad having a refractive index $n_4$ and surrounding the inner clad, wherein an ring having a refractive index $n_3$ is disposed between the inner clad and the outer clad.

The core may have a trapezoid shape. Also, a difference in refractive index between the core and the outer clad may be 1.2 to 1.6%, a difference in refractive index between the inner clad and the outer clad may be 0.4 to 0.8%, and a difference in refractive index between the ring and the outer clad may be 0.2 to 0.6%. Further, the thickness of the ring may be 0.8 to 1.2 times as much as that of the core, and the thickness of the inner clad may be 1 to 3 times as much as that of the core. In the DCF, a Raman gain coefficient per effective area may be 6.5 $km^{-1}W^{-1}$ or more, an effective area may be 20 $\mu m^2$ or less, and a dispersion value in the S-band may be $-100$ to $-170$ ps/nm/km. Preferably, a Raman gain coefficient per effective area is 6.5 $km^{-1}W^{-1}$ or more, an effective area is 9 to 11.9 $\mu m^2$ or less, and a dispersion value in the S-band is $-120$ to $-150$ ps/nm/km.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Figure 1:
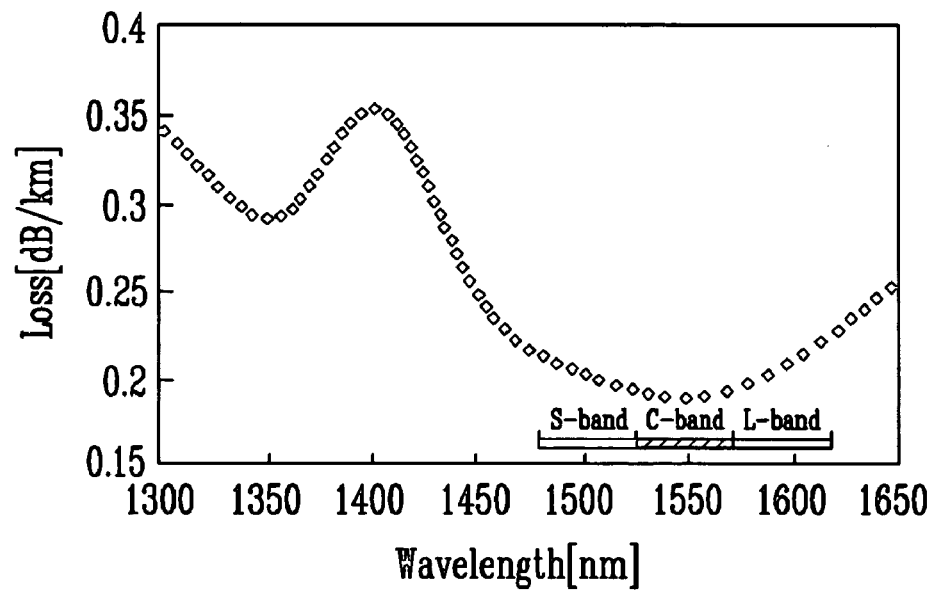
FIG. 1 is a graph illustrating the loss spectrum of a silica fiber.

The present invention will now be described more fully hereinafter with reference to the accompanying drawings, in which exemplary embodiments of the invention are shown. In the drawings, the thicknesses of layers may be exaggerated for clarity, and the same reference numerals are used to denote the same elements throughout the drawings.

Figure 2:
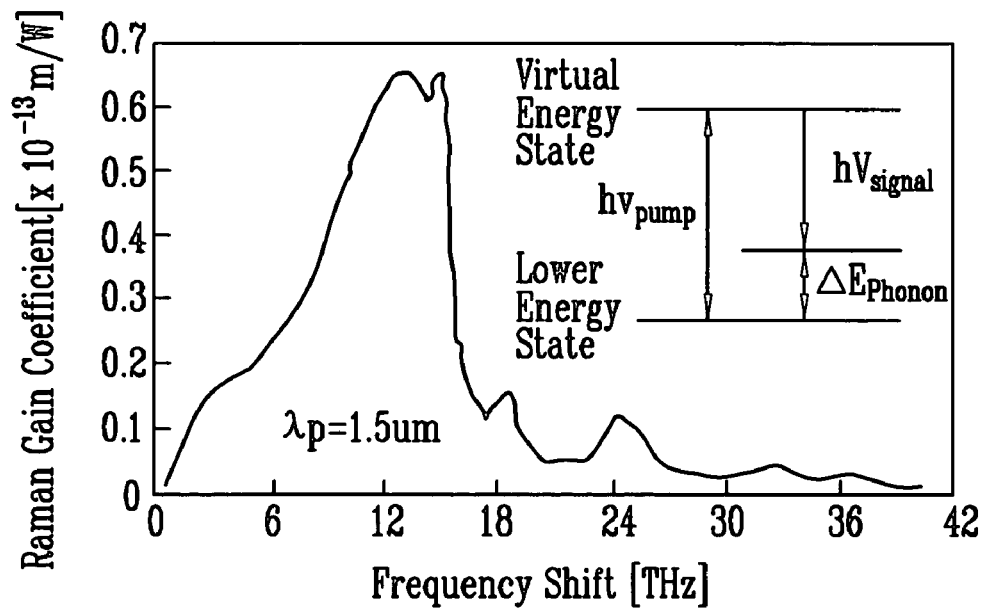
FIG. 2 is a graph illustrating the Raman gain spectrum of a pure silica fiber.

In general, a Raman amplifier (RA) is based on the principle that gain is generated while an optical signal with high energy state is being converted into another signal with lower energy state by pump signal due to Raman scattering, which is a nonlinear phenomenon. The Raman gain spectrum of a pure silica fiber is illustrated in FIG. 2. Referring to FIG. 2, the Raman gain coefficient of the pure silica fiber has a bandwidth of 40 THz and reaches a peak at 13.2 THz. Since the gain band of the RA varies with a pump wavelength, the RA can achieve gain in a wide band by appropriately adjusting the pump wavelength.

Figure 3:
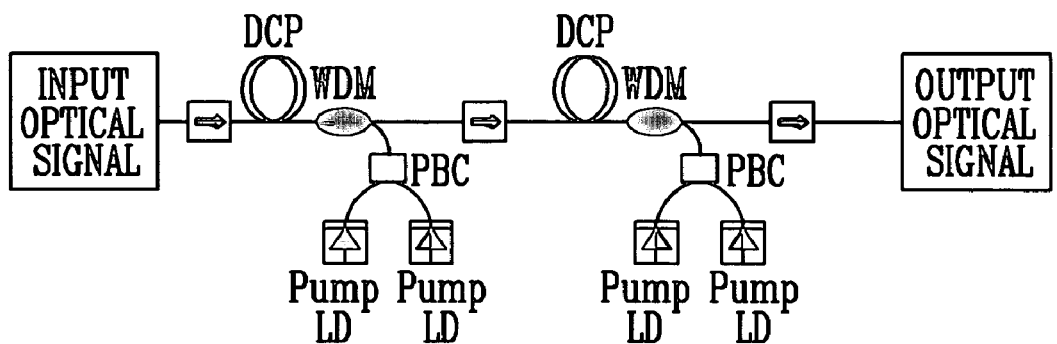
FIG. 3 is a structure of a conventional S-band discrete Raman amplifier (RA)

FIG. 3 schematically shows the structure of a conventional S-band discrete RA. The S-band discrete RA, which is a two-stage amplifier, includes four pump laser diodes (LDs) for backward pumping. While an S-band optical signal passes through an isolator and a first DCF, gain is generated due to pump signals of the two pump LDs. An amplified signal passes through another isolator again and is transmitted to a second DCF, so it is amplified again due to pump signals of the remaining two pump LDs. In the S-band discrete RA, isolators are placed at an input portion and an output portion and between two DCFs in order to prevent the optical signal from being reflected by the DCFs or each element and causing interference.

Figure 4:
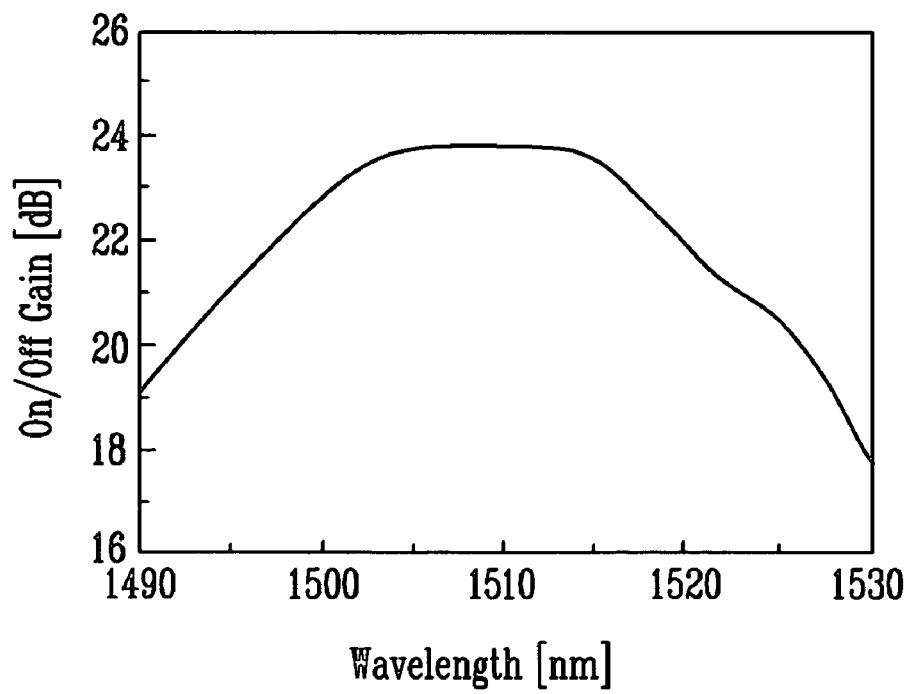
FIG. 4 is a graph illustrating the gain spectrum of the S-band discrete RA shown in FIG. 3.
Figure 5:
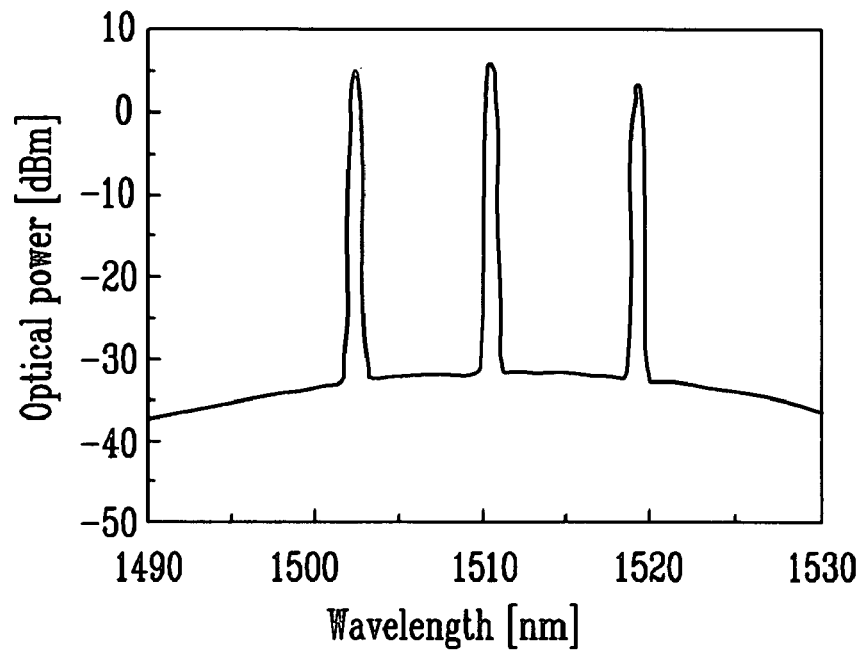
FIG. 5 is a graph illustrating the output spectrum of the S-band discrete RA shown in FIG. 3.

The gain and output characteristics of the above-described S-band discrete RA are illustrated in FIGS. 4 and 5, respectively. Referring to FIG. 4, a broadband source of 150 mA is used as the input signal, the four pump LDs have wavelengths of 1400, 1410, 1420, and 1430 nm, respectively, and the total output of the pump LDs is 700 mW. As shown in FIG. 4, a gain curve is symmetric with respect to the wavelength of 1510 nm and a gain bandwidth is 35 nm. The gain band of the S-band discrete RA can be controlled by the wavelengths of the pump LDs. When the input power of the S-band optical signal is −2 dBm (i.e., −7 dBm/ch), the output power is 11 dBm (i.e., 6 dBm/ch).

Figure 6:
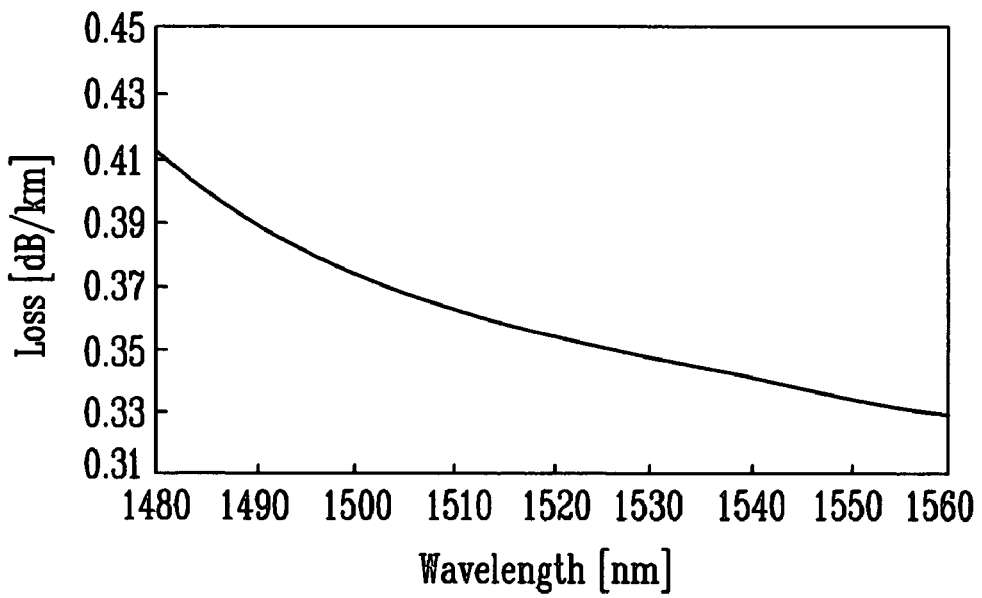
FIG. 6 is a graph illustrating the loss spectrum of a conventional C-band dispersion compensating fiber (DCF)
Figure 7:
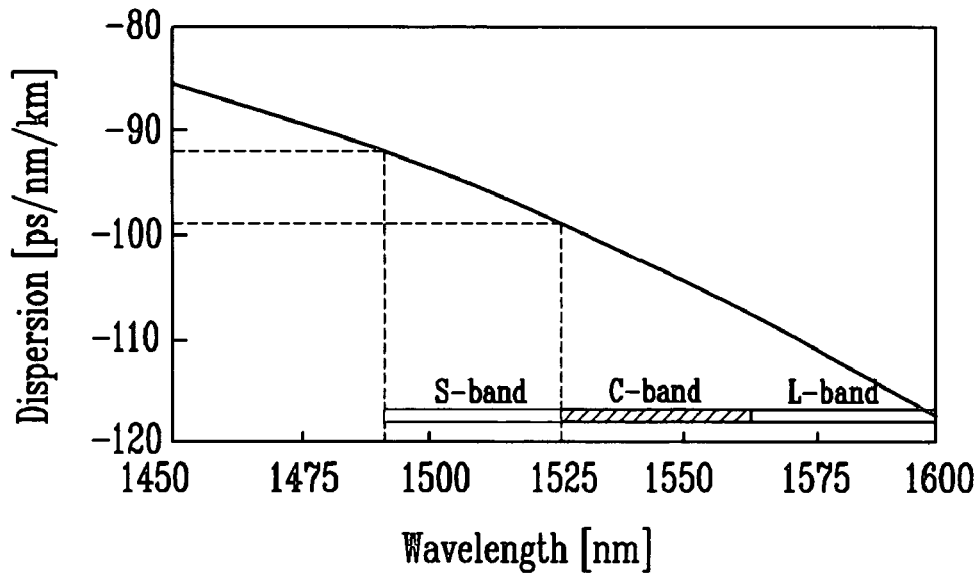
FIG. 7 is a graph illustrating the dispersion of the conventional C-band DCF.

The DCFs used in the above-described S-band discrete RA are conventional C-band DCFs, and FIGS. 6 and 7 show the loss and dispersion characteristics of the conventional C-band DCF in the S-band. The loss of the DCFs in the S-band is about 0.04 dB/km greater than the loss of DCFs in the C-band, and there is a difference of about 1 dB in terms of the total loss of the DCFs (when the total length of the DCFs is about 20 km).

Figure 8:
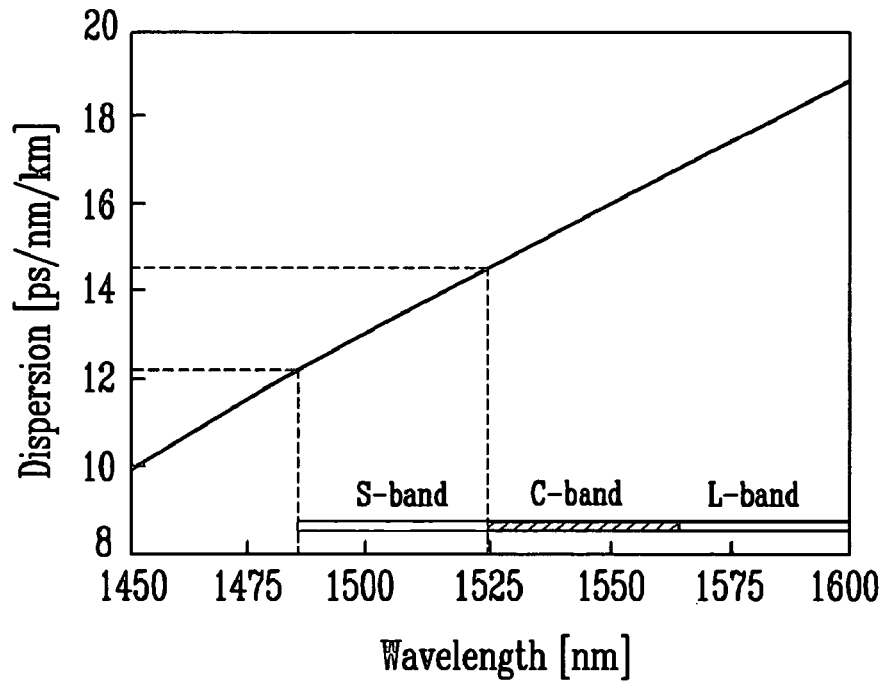
FIG. 8 is a graph illustrating the dispersion of a conventional single mode fiber (SMF)

Since the dispersion of the DCF is smaller in the S-band than in the C-band, when the dispersion of a single mode fiber (SMF) is compensated for as shown in FIG. 8, the residual dispersion in the S-band becomes larger than in the C-band.

Figure 9:
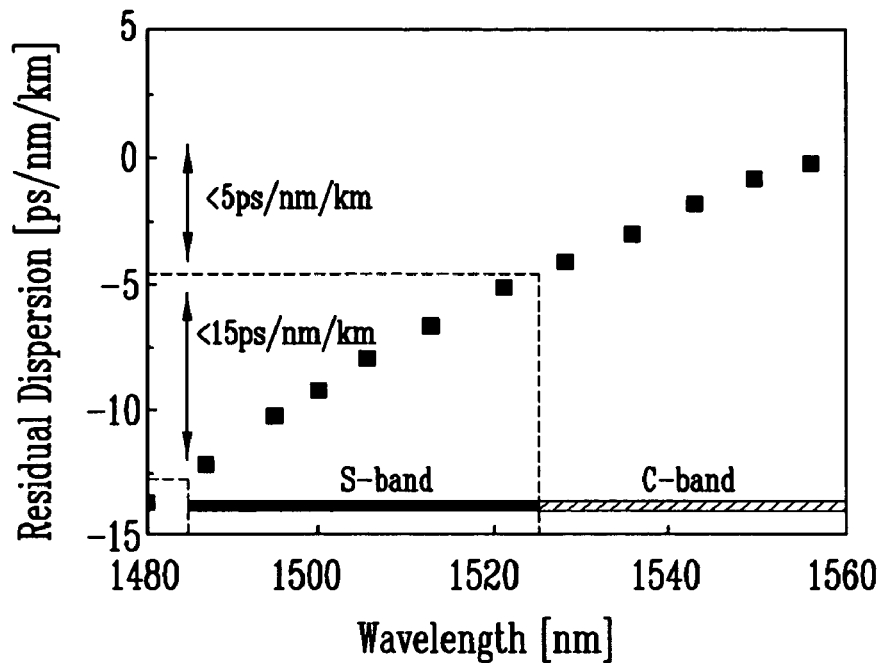
FIG. 9 is a graph illustrating the residual dispersion when the conventional C-band DCF compensates for the dispersion of the SMF.

FIG. 9 is a graph illustrating the residual dispersion when the conventional C-band DCF compensates for the dispersion of the SMF. The residual dispersion in the C-band is less than about 5 ps/nm/km; but the residual dispersion in the S-band is less than about 15 ps/nm/km, which is 3 times as large as the residual dispersion in the C-band.

In this connection, the present invention proposes a new DCF, which has characteristics and structure appropriate for an amplification medium of an S-band discrete RA. The most suitable fiber for the S-band discrete RA should have the following characteristics:

1) A large negative dispersion value: A DCF should have a large negative dispersion value to compensate for the dispersion of an SMF in the S-band, and the length of the DCF required for the dispersion compensation should be small to minimize the loss of the DCF. Accordingly, in order to compensate for the dispersion of an SMF using a DCF with the smallest length, the DCF should have a large negative dispersion value. The dispersion of the C-band DCF in the wavelength of 1500 nm is −95 ps/nm/km.

2) An appropriate dispersion slope: In a transmission system, such as a wavelength division multiplexer (WDM) system, which simultaneously receives signals from 40 channels or more, the residual dispersion of each of the channels significantly affects the performance of the transmission system. The dispersion slope of the DCF is controlled such that the residual dispersion is minimized.

3) A high Raman gain coefficient: A Raman gain G is a function of Raman gain coefficient g, pump power P, effective area $A_{eff}$, fiber length L, and loss, as expressed in Equation 1:

$$G(v) = 4.34\left[\frac{g(v)PL}{A_{eff}\kappa\alpha}(1-e^{-\alpha L}) - \alpha'(v)L\right], \quad (1)$$

where, $\alpha$ and $\alpha'$ refer to loss in the wavelength of a pump signal and loss in the wavelength of an input signal, respectively, and $\kappa$ refers to the polarization of an optical fiber having a cylindrical core (i.e., $\kappa=2$). Accordingly, the Raman gain coefficient g should be high to raise the Raman gain G.

4) A small effective area: Since the Raman gain of an optical fiber is inversely proportional to the effective area of the optical fiber, the effective area of the optical fiber should be scaled down to increase the Raman gain.

5) Low loss: In order to maximize the gain of an RA, loss should be small in the S-band. In a conventional C-band DCF, loss is 0.37 dB/km in the wavelength of 1500 nm as shown in FIG. 6.

6) A suitable mode in a band: A fiber should be in a single mode in the S-band. Thus, cutoff wavelength should be less than 1300 nm.

A DCF that satisfies the characteristics 1) through 6) can be designed considering a relationship of the structure of the DCF with the dispersion and Raman gain coefficient thereof.

Meanwhile, a typical DCF has a staircase structure having a core with a high refractive index. However, because the staircase structure has a too high dispersion slope, the residual dispersion is great in a wide band. A structure for compensating for the dispersion slope of the staircase structure was proposed by Lars Gruner-Nielsen ["Dispersion-compensating module", U.S. Pat. No. 6,654,531 B2, Nov. 25, 2003].

Figure 10:
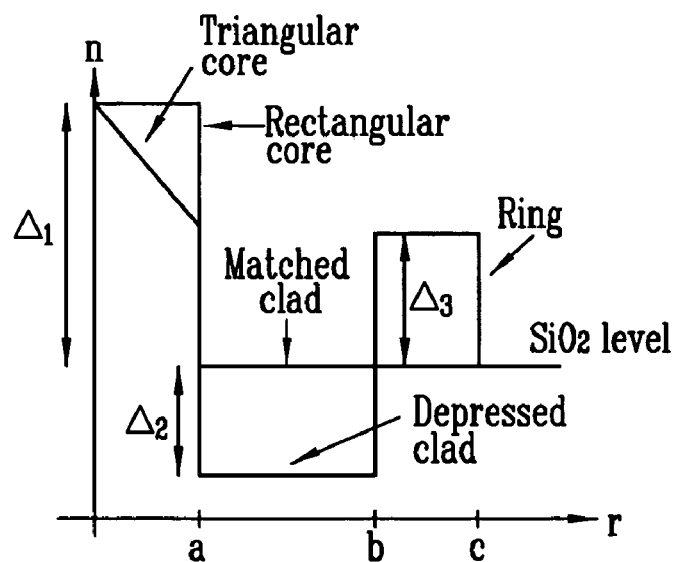
FIG. 10 is a graph illustrating various core and clad structures of an optical fiber.
Figure 11:
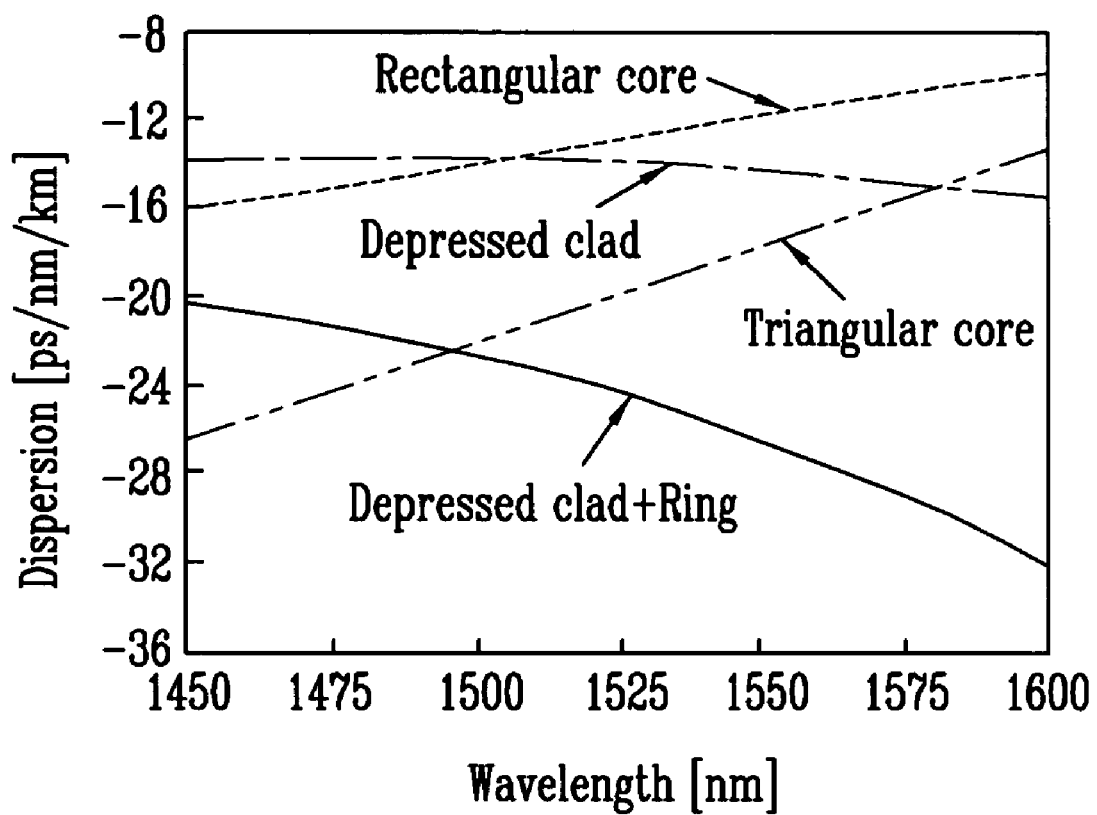
FIG. 11 is a graph illustrating dispersion curves in the various core and clad structures shown in FIG. 10.

FIG. 10 is a graph illustrating various core and clad structures of an optical fiber, and FIG. 11 is a graph illustrating dispersion of the various core and clad structures. In FIG. 10, a core has a radius "a" of 1.73 mm, a clad has a radius "b" of 4.79 mm, and a ring has a radius "c" of 6.5 mm. A difference $\Delta_1$ in refractive index between the core and a matched clad is 1.45%, a difference $\Delta_2$ in refractive index between a depressed clad and the matched clad is $-0.63\%$, and a difference $\Delta_3$ between the ring and the matched clad is 0.47%. A DCF with a triangular core has a larger negative dispersion value in a short wavelength than a DCF with a rectangular core.

Also, the depressed clad structure can change the dispersion slope of a DCF, and a negative dispersion value can be larger by adding the ring to the depressed clad. The dispersion slope of a DCF should be opposite to that of an SMF, and the DCF should have a large negative dispersion value.

Accordingly, in the present invention, a DCF is designed as a structure including a core in which a rectangular portion and a triangular portion are properly combined, a depressed clad, and an outer clad with a ring.

Raman gain coefficient is proportional to the concentration of Ge doped into a core and the refractive index of the core, as expressed in Equation 2. Also, as the concentration of Ge in the core increases, the refractive index of the core increases. Thus, the Raman gain coefficient can be raised by elevating the refractive index of the core. However, a too high refractive index of the core leads to a small negative dispersion value of an optical fiber. Therefore, it is required to optimize the refractive index of the core in consideration of both the dispersion and the Raman gain coefficient.

$$g(v) = (1.2S10^{-11}/\lambda)\sigma_0(\chi_{GeO_2}, v)S\left[\frac{n}{n+\Delta n}\right]^2 \quad (2)$$

$$\sigma_0(\chi_{GeO_2}, v) = [1 + C(v)E_{\chi_{GeO_2}}]E_{\sigma_0}(SiO_2, v), \quad (3)$$

wherein, $\sigma_0$ refers to Raman cross sectional area and is proportional to the concentration of Ge as shown in Equation 3. C refers to a proportional constant, and $X_{GeO2}$ refers to the concentration of Ge.

To reduce the effective area, the radius of the core should be minimized and the core should be designed in consideration of a dispersion characteristic. If the refractive index of the core is high, reflection occurs due to a large difference in refractive index between the core and the clad, and this leads to loss.

Accordingly, in the present invention, a ring is added to an outer clad for lowering loss caused by a large difference in refractive index between the core and the clad.

Figure 12:
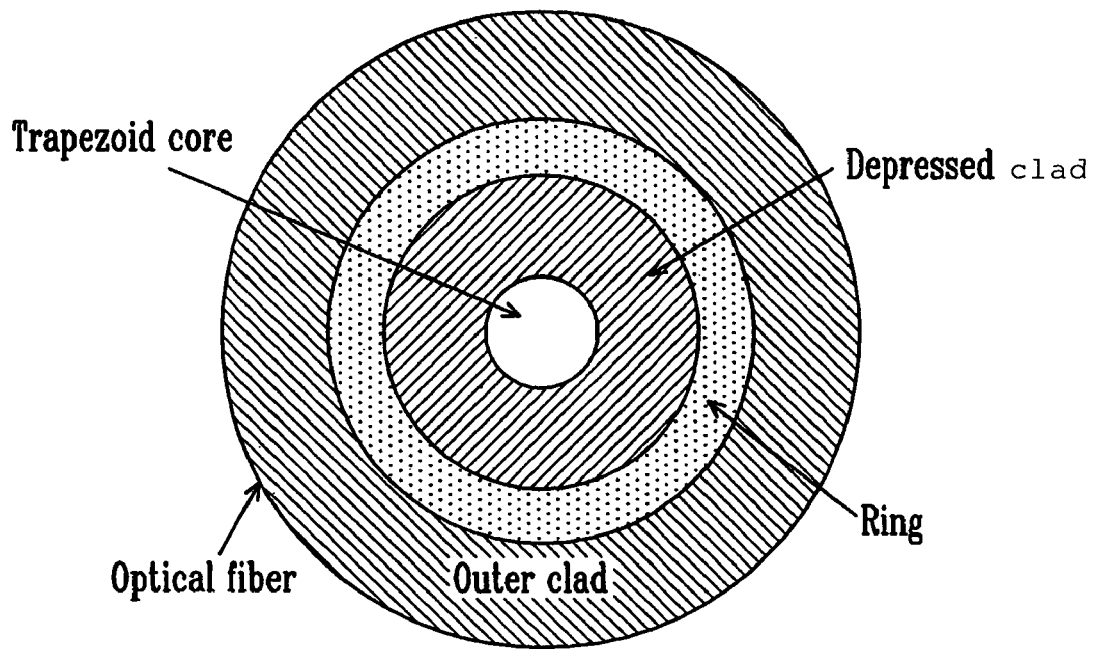
FIG. 12 is a cross sectional view for explaining the structure of a DCF according to an exemplary embodiment of the present invention.
Figure 12:
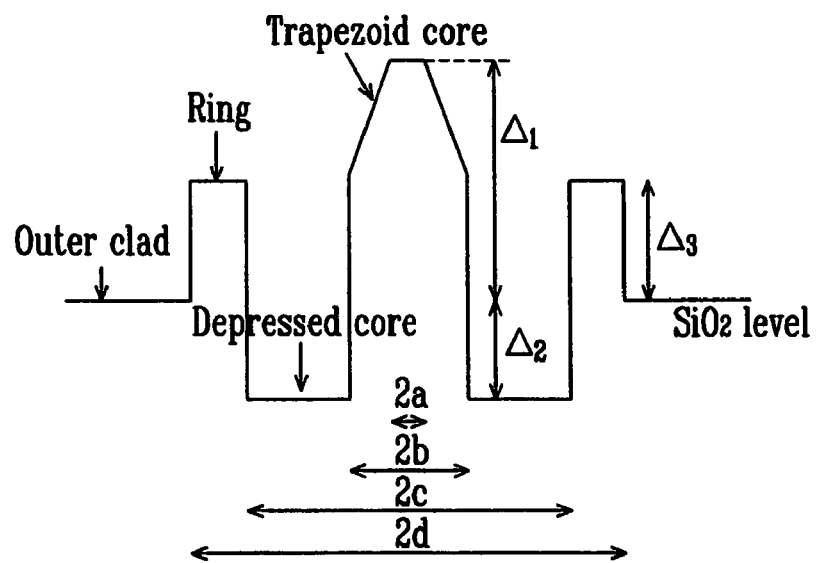

FIG. 12 is a cross sectional view for explaining the structure of a DCF according to an exemplary embodiment of the present invention, which is obtained in consideration of the above-described characteristics 1) through 6) required for the S-band discrete RA. According to an embodiment as shown in FIG. 12 of the present invention, the structure of the DCF includes, inter alia, a trapezoid core, a depressed clad (or an inner clad, and a ring. The core has a radius "b" of 1.73 mm (here, a=0.5 mm), the depressed clad has a radius "c" of 4.79 mm, and the ring has a radius "d" of 6.5 mm. A difference $\Delta_1$ in refractive index between the core and a matched clad is 1.45%, a difference $\Delta_2$ in refractive index between the depressed clad and the matched clad is $-0.63\%$, and a difference $\Delta_3$ between the ring and the matched clad is 0.47%. The core of the present invention is referred to as the "trapezoid core" (as shown in FIG. 12, top) because the refractive index plotted across the diameter of the core as a function of distance is substantially trapezoidal in shape (as shown in FIG. 12, bottom).

Figure 13:
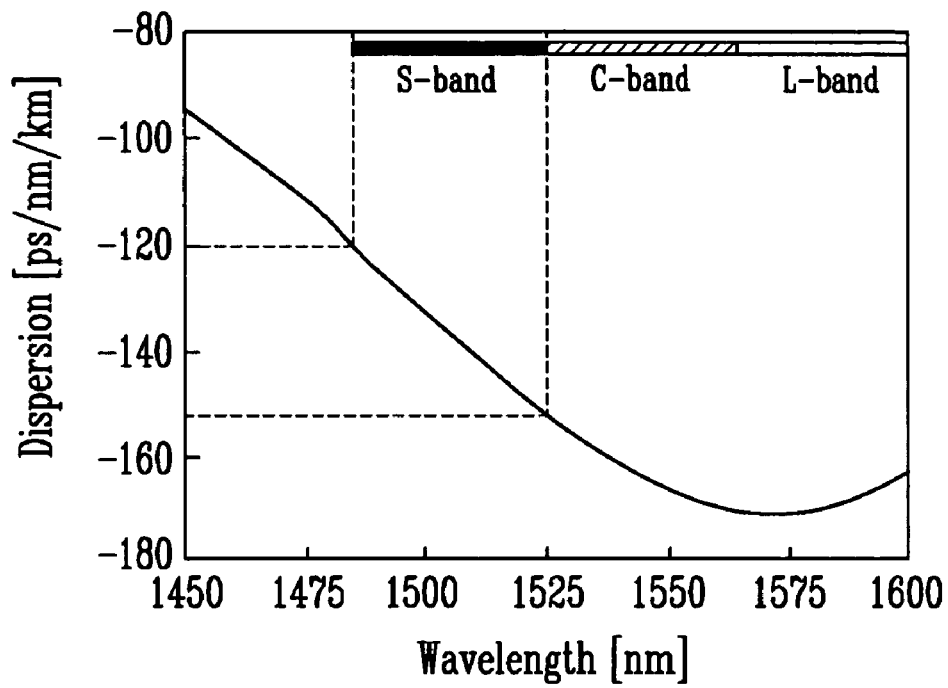
FIG. 13 is a graph illustrating the dispersion of the DCF shown in FIG. 12.
Figure 14:
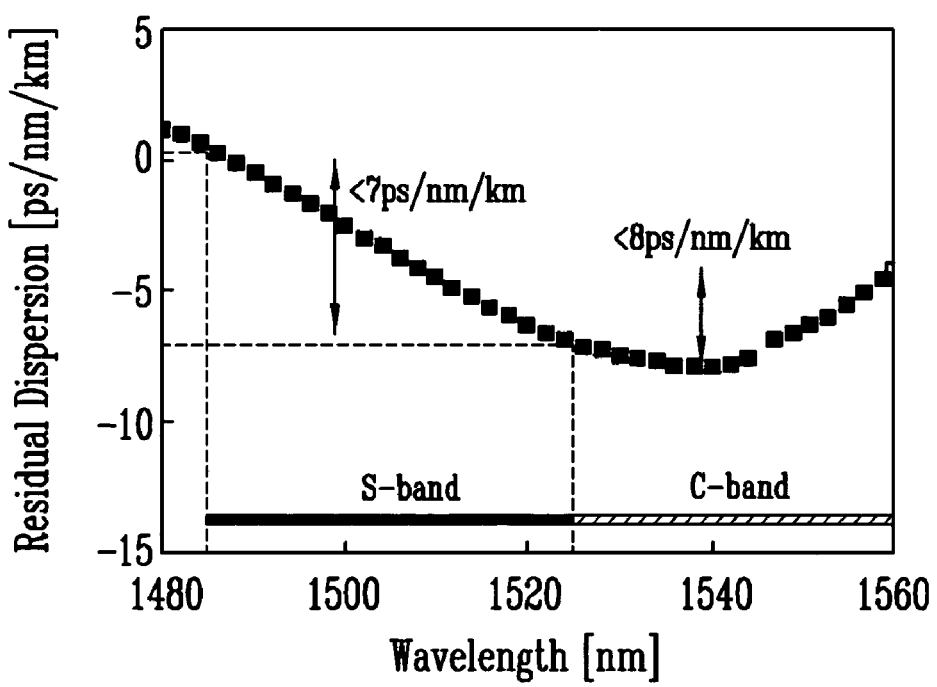
FIG. 14 is a graph illustrating the residual dispersion when the DCF shown in FIG. 12 compensates for the dispersion of an SMF.

FIG. 13 is a graph illustrating the dispersion of the DCF shown in FIG. 12. The DCF has a negative dispersion value of $-120$ to $-150$ ps/nm/km. When the DCF having the above-described dispersion value compensates for the dispersion of an SMF, the residual dispersion is illustrated in FIG. 14. As shown in FIG. 14, the residual dispersion in the S-band is less than 7 ps/nm/km, and the residual dispersion in the C-band is less than 8 ps/nm/km. The residual dispersion of the DCF according to the present invention is 2 time or less as small as that (i.e., 15 ps/nm/km) of the C-band DCF in the S-band.

Also, the Raman gain coefficient of the DCF according to the present invention can be calculated using Equations 2 and 3. A variation in refractive index according to the concentration of Ge is obtained using the Sellmeier equation as shown in Equation 4:

$$n^2 - 1 = \sum_{i=1}^{3} \frac{[SA_i + X(GA_i - SA_i)]\lambda^2}{\lambda^2 - [Sl_i + X(Gl_i - Sl_i)]^2}, \quad (4)$$

wherein, SA, Sl, GA, and Gl refer to Sellmeier coefficients in $SiO_2$ and Ge glasses, and X refers to the concentration of Ge.

Figure 15:
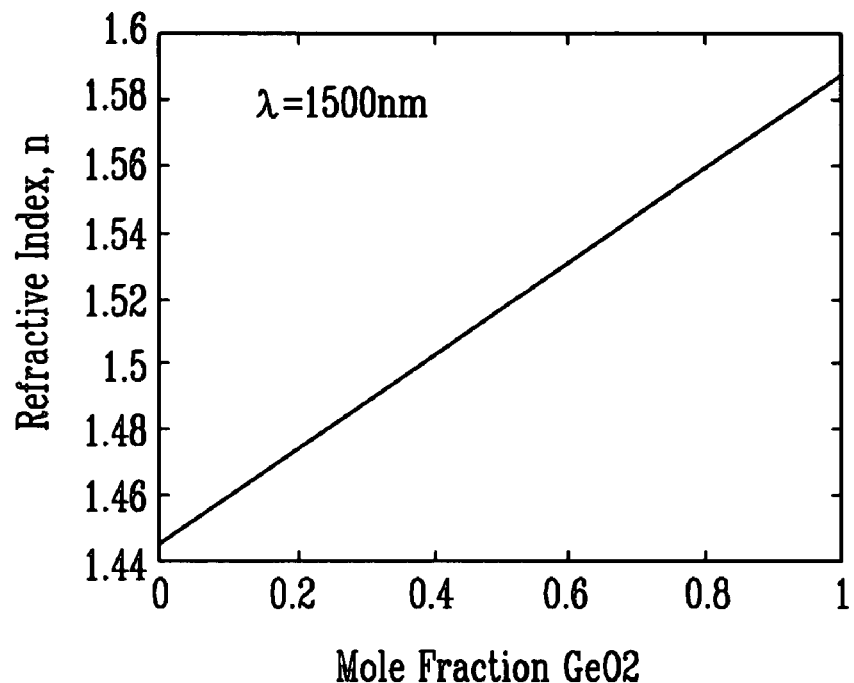
FIG. 15 is a graph of the refractive index relative to the concentration of Ge in the wavelength of 1500 nm.

FIG. 15 is a graph of the refractive index according to the concentration of Ge (i.e., mole fraction of $GeO_2$) in the wavelength of 1500 nm. As shown in FIG. 15, since a difference in refractive index "n" between the core and the clad is 0.02, the mole fraction of $GeO_2$ corresponds to about 14%. By substituting the difference in refractive index "n" and the mole fraction of $GeO_2$ into Equations 2 and 3, the Raman gain coefficient is $0.78 \times 10^{-13}$ m/W.

Then, the effective area of the DCF according to the present invention is calculated using Equation 5. Thus, in the wavelength of 1500 nm, the effective area of the DCF is 11.9 $\mu m^2$, which is considerably smaller than that (about 20 $\mu m^2$) of the conventional C-band DCF.

$$A_{eff} = \frac{2\pi \left[ \int_0^\infty E(r)^2 r\, dr \right]^2}{\int_0^\infty E(r)^4 r\, dr} \quad (5)$$

Accordingly, if a value obtained by dividing the Raman gain coefficient g by the effective area $A_{eff}$ is defined as Raman gain coefficient per effective area ($g/A_{eff}$), the $g/A_{eff}$ of the DCF according to the present invention is 6.5 $Km^{-1}W^{-1}$, which is increased by about 47% more than that (4.4 $km^{-1}W^{-1}$ of the conventional C-band DCF.

Also, the ring is added to the outer clad in order to reduce loss caused by a difference in refractive index between the core and the clad. The cutoff wavelength is 700 nm, and the DCF is in a single mode in the S-band. The figure of merit (FOM) of the DCF is expressed in Equation 6. Here, the wavelength is 1500 nm, and the loss of the DCF according to the present invention is assumed as 0.8 dB/km considering the refractive index and radius of the core. Thus, the FOM of the DCF is 8.1 $dB^{-1}W^{-1}$, which is improved by about 62% as compared with the FOM (5 $dB^{-1}W^{-1}$) of the conventional C-band DCF.

$$FOM = g/(A_{eff} E\alpha) \quad (6)$$

Figure 16:
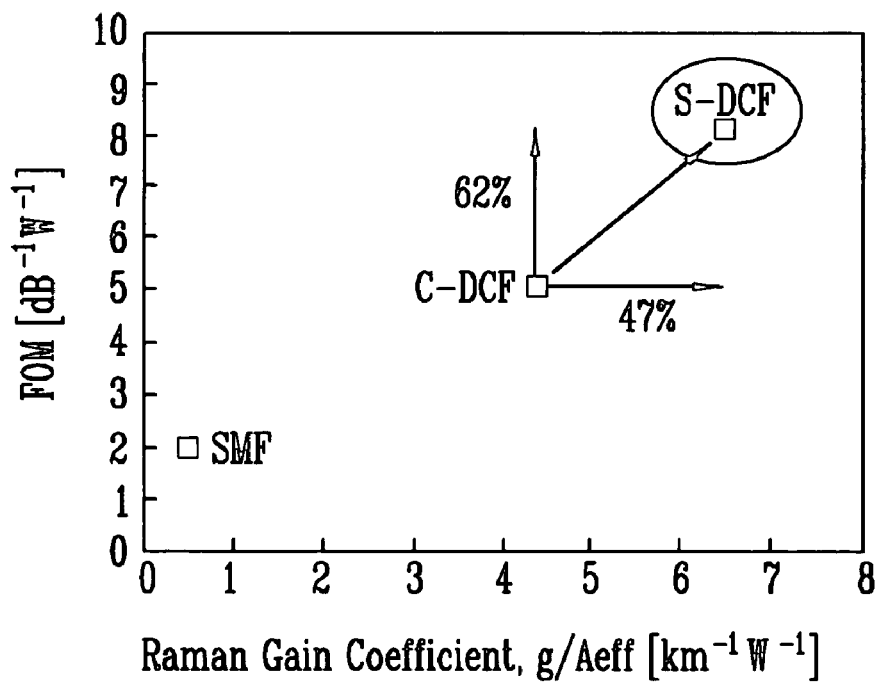
FIG. 16 is a graph showing results of a comparison among a SMF, a C-DCF, and the S-DCF shown in FIG. 12 in terms of Raman gain coefficient per effective area and figure of merit (FOM).

FIG. 16 is a graph showing results of a comparison among a SMF, C-DCF, and the S-DCF according to the exemplary embodiment of the present invention in terms of Raman gain coefficient per effective area ($g/A_{eff}$) and FOM. The results of a comparison of characteristics between the S-DCF according to the present invention and the conventional C-DCF are shown in Table 1.

A DCF for an S-band discrete RA as proposed in the present invention has a large negative dispersion value in the S-band, a dispersion slope opposite to that of an SMF, a small residual dispersion, a high Raman gain coefficient per effective area, and a high FOM. Hence, the performance of the S-band discrete RA can be greatly enhanced.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A dispersion compensating fiber (DCF), which is an amplification medium of an S-band discrete Raman amplifier (RA), comprising:
    a trapezoid core wherein the refractive index plotted across the diameter of the trapezoid core as a function of distance is substantially trapezoidal in shape;
    an inner cladding surrounding the trapezoid core, wherein the refractive index of the inner cladding is different from the refractive index at the boundary of the trapezoid core contacting the inner cladding; and
    an outer cladding surrounding the inner cladding,
        wherein a ring is disposed between the inner cladding and the outer cladding.

2. The dispersion compensating fiber (DCF) according to claim 1, wherein a difference in refractive index between the trapezoid core and the outer cladding is 1.2 to 1.6%, a difference in refractive index between the inner cladding and the outer cladding is 0.4 to 0.8%, and a difference in refractive index between the ring and the outer cladding is 0.2 to 0.6%.

3. The dispersion compensating fiber (DCF) according to claim 1, wherein the thickness of the ring is 0.8 to 1.2 times as much as that of the radius of the trapezoid core, and the

TABLE 1

| | Dispersion [ps/nm/km]@S-band | Dispersion [ps/nm/km]@S-band | λc[nm] | $A_{eff}[\mu m^2]$ @1500 nm | $g/A_{eff}[km^{-1}W^{-1}]$ @1500 nm | $FOM[dB^{-1}W^{-1}]$ @1500 nm |
|---|---|---|---|---|---|---|
| SDCF | −120 to −150 | 0 to −7 | 700 | 11.9 | 6.5 | 8.1 |
| CDCF | −92 to −100 | −5 to −15 | 800 | 20 | 4.4 | 5 |

In conclusion, the DCF according to the present invention includes the trapezoid core having a small radius and a high refractive index, the depressed clad, and the outer clad with the ring. In this structure, the DCF, which is appropriate for the S-band discrete RA, has a large negative dispersion value in the S-band, a dispersion slope opposite to that of an SMF, and a high Raman gain coefficient per effective area so as to increase Raman gain.

As well known to those skilled in the art, in addition to the above-described method, there are a variety of methods for embodying optical fibers appropriate for an S-band discrete RA by making changes to the refractive indexes and radiuses of a core and a clad.

thickness of the inner cladding is 1 to 3 times as much as that of the radius of the trapezoid core.

4. The dispersion compensating fiber (DCF) according to claim 1, wherein a Raman gain coefficient per effective area is 6.5 $km^{31\ 1}W^{-1}$ or more, an effective area is 20 $\mu m^2$ or less, and a dispersion value in the S-band is −100 to −170 ps/nm/km.

5. The dispersion compensating fiber (DCF) according to claim 1, wherein a Raman gain coefficient per effective area is 6.5 $km^{-1}W^{-1}$ or more, an effective area is 9 to 11.9 $\mu m^2$ or less, and a dispersion value in the S-band is −120 to −150 ps/nm/km.

* * * * *